United States Patent
Periyaeluvan et al.

(10) Patent No.: US 10,917,805 B2
(45) Date of Patent: Feb. 9, 2021

(54) DYNAMIC MEASUREMENT OF NETWORK HEALTH

(71) Applicant: SLING MEDIA PVT LTD, Bangaluru (IN)

(72) Inventors: Rakesh Eluvan Periyaeluvan, Bangalore (IN); Narayana Rao, Bangalore (IN); Vivek Maran, Bangalore (IN)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

(21) Appl. No.: 16/856,541

(22) Filed: Apr. 23, 2020

(65) Prior Publication Data
US 2020/0252816 A1 Aug. 6, 2020

Related U.S. Application Data

(63) Continuation of application No. 15/918,146, filed on Mar. 12, 2018, now Pat. No. 10,652,771.

(30) Foreign Application Priority Data

Mar. 13, 2017 (IN) .............................. 201741008629

(51) Int. Cl.
| | | |
|---|---|---|
| *H04W 24/08* | (2009.01) | |
| *H04W 24/02* | (2009.01) | |
| *H04W 28/02* | (2009.01) | |
| *H04W 84/12* | (2009.01) | |

(52) U.S. Cl.
CPC ........... *H04W 24/08* (2013.01); *H04W 24/02* (2013.01); *H04W 28/0205* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 9,432,999 B1* | 8/2016 | Tkach | ............... H04W 28/0205 |
| 10,652,771 B2 | 5/2020 | Periyaeluvan et al. | |
| 2004/0054766 A1* | 3/2004 | Vicente | ............... H04L 41/5009 |
| | | | 709/223 |
| 2004/0125779 A1* | 7/2004 | Kelton | .................. H04W 72/12 |
| | | | 370/338 |
| 2004/0192322 A1* | 9/2004 | Dacosta | ................ H04W 28/20 |
| | | | 455/452.1 |

(Continued)

FOREIGN PATENT DOCUMENTS

| | | |
|---|---|---|
| EP | 3596962 A1 | 1/2020 |
| WO | 2018167653 A1 | 9/2018 |

*Primary Examiner* — Kevin C. Harper
*Assistant Examiner* — Derrick V Rose
(74) *Attorney, Agent, or Firm* — Lorenz & Kopf LLP

(57) ABSTRACT

A method for determining the health of a network includes determining, for a set of clients within the network, a total air percentage for each of the plurality of clients, and determining a total air percentage for a first access point within the network. The method further includes determining a transmit opportunity corresponding to a percentage of time a channel medium is free; determining a total air percentage used by a set of second access points; determining an air margin for the network, and determining an overall health classification for the network based on the air margin.

20 Claims, 3 Drawing Sheets

(56) References Cited

U.S. PATENT DOCUMENTS

| | | | |
|---|---|---|---|
| 2015/0173095 A1* | 6/2015 | Ansley | H04L 47/6275 |
| | | | 370/336 |
| 2016/0066202 A1* | 3/2016 | Dayanandan | H04W 16/00 |
| | | | 370/252 |
| 2020/0252816 A1 | 8/2020 | Periyaeluvan et al. | |

* cited by examiner

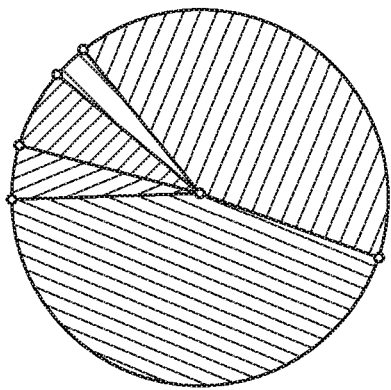
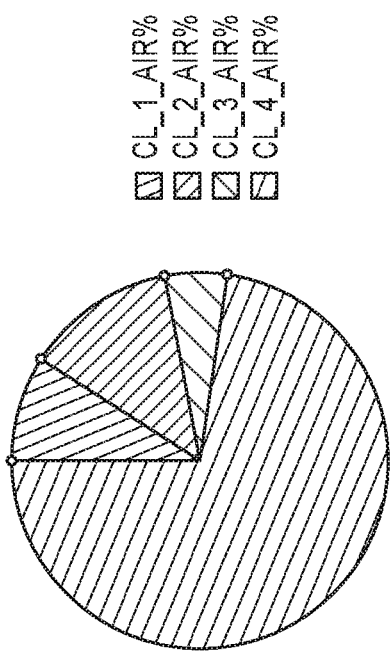
FIG. 3
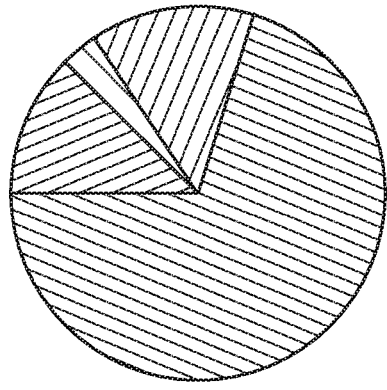
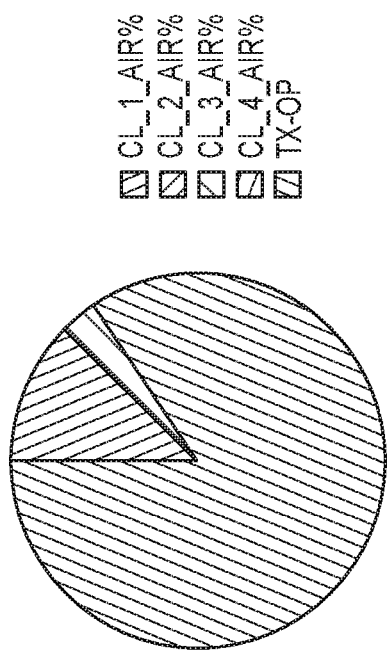
FIG. 4
FIG. 5
FIG. 6

DYNAMIC MEASUREMENT OF NETWORK HEALTH

CROSS-REFERENCE TO RELATED APPLICATIONS

This application claims priority to Indian Provisional Patent App. No. 201741008629, filed Mar. 13, 2017, and to U.S. patent application Ser. No. 15/918,146, filed Mar. 12, 2018, the contents of both applications are hereby incorporated by reference.

TECHNICAL FIELD

The following discussion generally relates to data communication, particularly wireless data communication. More particularly, the following subject matter relates to methods for accessing the health of a wireless network.

BACKGROUND

Recent years have seen a dramatic increase in the use of mobile devices in conjunction with wireless networks, such as WiFi networks. At the same time, there has been a marked increase in the creation and enjoyment of digital video content. This is in part due to the fact that millions of people around the world now carry mobile phones, cameras or other devices that are capable of capturing high-quality video and/or of playing back video streams in a convenient manner.

In some contexts in which a processing device—e.g., a video processing device adapted to receive video content from multiple mobile devices or "clients" over a wireless network via another client access point—it is often the case that a number of other access points might be operating in the same area and receiving/transmitting packets within the same channel(s) as the processing device. The resulting competition over resources (i.e., between access points and the mobile devices themselves) can negatively affect the bandwidth available for data transmission between the individual mobile devices and the processing device, particularly in the case of the transmission of video and other high-bandwidth data.

It is therefore desirable to create systems and methods for dynamically determining the health (e.g., bandwidth, capacity, etc.) of a wireless network and using that information to improve the user experience for users of that network. Other desirable features and characteristics will become apparent from the subsequent detailed description and the appended claims, taken in conjunction with the accompanying drawings and this background section.

BRIEF SUMMARY

Various embodiments provide systems, devices and processes to dynamically determine the health of a WiFi or other wireless data communication network and subsequently suggest (or automatically implement) change to improve connectivity between the clients and access points within the network through adaptive data rate adjustment, diagnostics, and the like. The systems and methods described herein are particularly advantageous, for example, in cases where multiple client devices (e.g., mobile devices) are communicating with an access point while other access points are simultaneously utilizing the same WiFi channels. In one embodiment, a numeric value indicative of network health is produced as an output (e.g., an "air margin"), and is based on various parameters available and/or computable within the processing device itself.

A method for determining the health of a network in accordance with one embodiment includes determining, for a plurality of clients within the network, a total air percentage for each of the plurality of clients; determining, with a processor, a total air percentage for a first access point within the network; determining, with a processor, a transmit opportunity corresponding to a percentage of time a channel medium is free; determining, with a processor, a total air percentage used by a set of second access points; determining, with a processor, an air margin for the network; and determining, with a processor, an overall health classification for the network based on the air margin.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

FIGS. 3-6 are pie charts showing the percentage of "airtime" by multiple clients in accordance with various examples.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

As noted above, various embodiments are adapted to dynamically access the health of a wireless network and thereafter suggest changes that might improve data communication between clients and a respective processing device. In that regard, the systems and methods described herein may be used in a variety of contexts. Without loss of generality, the various systems and methods are often described in the context of a video production system in which one or more live video streams are received via a wireless network to produce an output video stream for publication or other sharing. The embodiments are not so limited, however. Any network in which multiple client devices are connected to a common access point may utilize the disclosed methods and systems.

Figure 1:
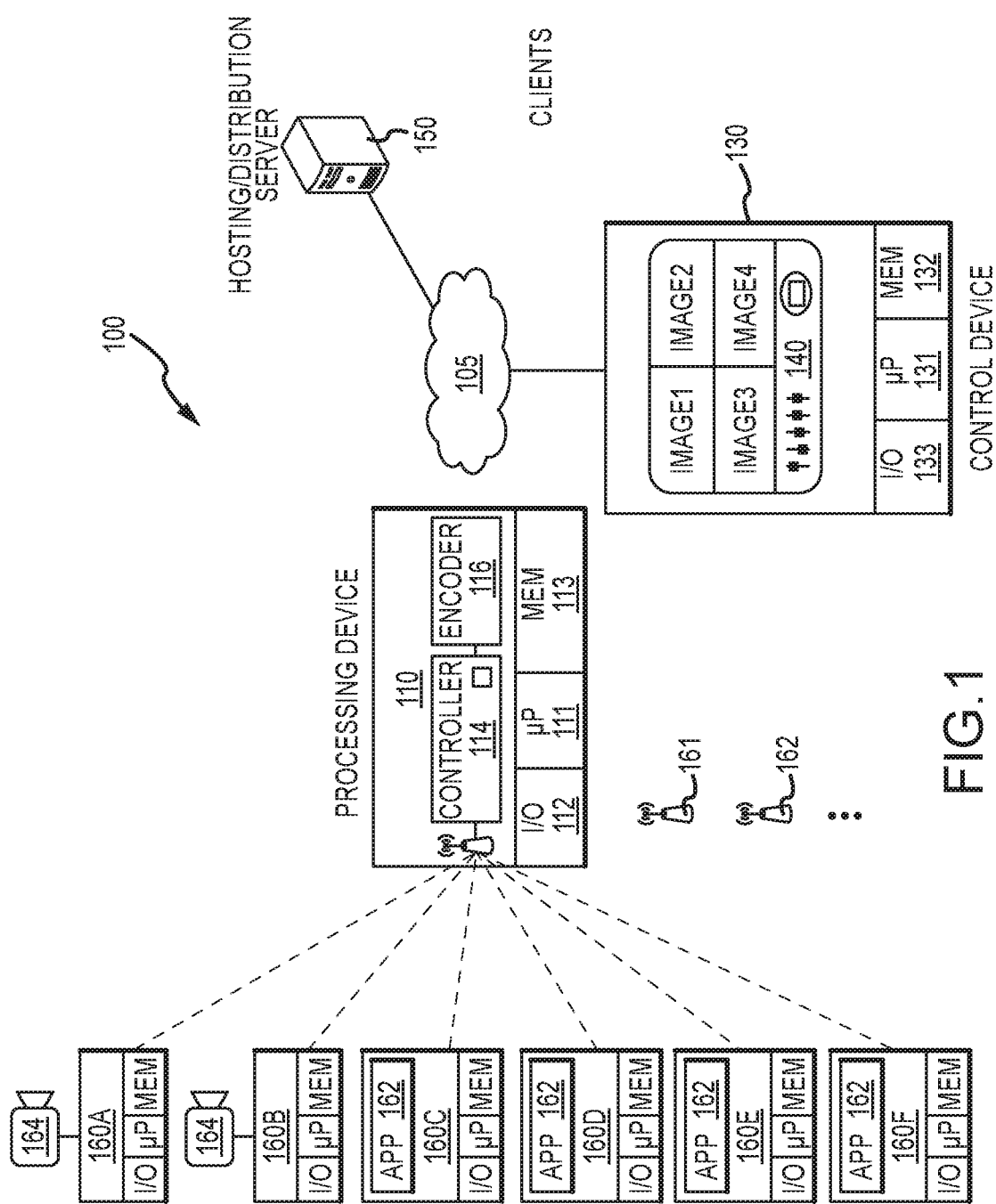
FIG. 1 is a diagram of an example system for encoding, producing and distributing live video content.

FIG. 1 illustrates an example of a video production system (or simply "system") 100 that might be used to produce a video program based upon selected inputs from multiple input video feeds. In the illustrated example, system 100 includes a video processing device (or simply "processing device") 110 that selects and encodes video content based on instructions received from a control device 130. The encoded video program may be initially stored as a file within an external storage device (e.g., a memory card, hard drive or other non-volatile storage) (not illustrated) for eventual uploading to a hosting or distribution service 150 operating on the Internet or another network 105. In some embodiments, the encoded video program is directly streamed or otherwise transmitted to a social media platform for viewing by the public, friends, or some other selected subset of individuals.

Processing device 110 includes suitable processing hardware such as a microprocessor 111, a memory 112, and input/output interfaces 113 (including, for example, a suitable USB or other interface to the external storage). Processing system 110 includes logic (implemented as hardware and/or software) that implements an IEEE 802.11, 802.14 or other wireless access point (AP) 115 for communicating with any number of clients 160, illustrated as an array of video capture devices 160A-F. In addition, other access points (such as APs 161 and 162) may be present in the environment and may attempt to share the same channels as those used by access point 115, as described in further detail below.

Clients 160 may include mobile phones, tablets, laptops or similar devices executing a video capture application 162, as desired. Clients 160 might also include one or more conventional video cameras 164 that interact with processing device 110 via an interface device that receives DVI or other video inputs and transmits the received video to the processing device 110 via a Wi-fi, Bluetooth or other wireless network, as appropriate. Other embodiments could facilitate communications with any other types of video capture devices in any other manner.

Processing system 110 also includes a controller 114 and an encoder 116, as appropriate. Controller 114 and/or encoder 116 may be implemented as software logic stored in memory 112 and executed on processor 111. Controller 114 may be implemented as a control application executing on processor 111, for example, that includes logic 117 for implementing the various processes described herein. In that regard, 117 may be referred to as a Wi-Fi channel capacity measurement module, or simply "CCM".

Other embodiments may implement the various functions and features using hardware, software and/or firmware logic executing on other components, as desired. Encoder 116, for example, may be implemented using a dedicated video encoder chip in some embodiments.

In various embodiments, processing device 110 operates in response to user inputs supplied by control device 130. Control device 130 may correspond to any type of computing device that includes a processor 131, memory 132 and input/output feature 133. In various embodiments, control device 130 is as a tablet, laptop or other computer system, for example, or a mobile phone or another computing device that executes a software application 140 for controlling the functions of system 100.

The example illustrated in FIG. 1 depicts control application 140 having an interface that shows various video feeds received from image collection devices 160A-F and lets the user select an appropriate feed to encode into the finished product. Application 140 may include other displays to control other behaviors or features of system 100, as desired. Typically, control device 130 interacts with processing device 110 via a wireless network, although wired connections could be equivalently used.

In operation, then, a user acting as a video producer uses application 140 to view the various video feeds that are available from one or more capture devices 160A-F. The selected video feed is received from the clients 160 by processing device 110. The video processing device 110 suitably compresses or otherwise encodes the selected video in an appropriate format for eventual viewing or distribution. Video encoding via encoder 116 occurs according to any standard, non-standard or other protocol, such as MPEG4.

Referring now to the flowchart of FIG. 2 in conjunction with the block diagram of FIG. 1, an exemplary method of dynamically determining the "health" of system 100 will now be described. As a preliminary matter, the nature of a typical WiFi data communication paradigm and various attributes of an exemplary AP 115 will first be discussed in some detail.

In some embodiments, AP 115 operates on a single WiFi channel at a fixed bandwidth. The WiFi Channel number and bandwidth form a unique combination, as is known in the art. For example, if AP 115 operates in channel number 155, then clients 160 connected to AP 115 will exchange data exclusively via channel 155.

At any location, it is possible that there are multiple APs operating in the same or different Wi-Fi channels (such as APs 161 and 162). APs that operate on different channel numbers will not interfere with each other, while APs that operate on the same channel will interfere with each other and result in reduction of bandwidth/throughput. If two or more APs are operating via the same channel number, then all the APs share the available WiFi medium in a "half-duplex" manner. For example, if AP 115 and AP 161 operate via channel 155, then at any point either of the APs can send data, but not simultaneously.

The Received Signal Strength Indicator (RSSI) is an indicator of the signal strength of data received at an AP. The higher the RSSI, the better the signal strength and better the throughput. The lower the RSSI, the lower the signal strength and lower the throughput. An RSSI value may be lower, for example, because of a greater distance between the client and AP, because of the presence of physical wall in between the client and the AP, or because of the presence of a crowd of people around the AP.

Signal-to-noise ratio ("SNR") is an indicator of signal quality or interference. The higher the SNR, the better the quality and better the throughput. The modulation coding scheme for each AP relates to the modulation technique involved. Each modulation technique on a specific bandwidth is directly related to a fixed data transmission rate, as is known in the art.

In accordance with various embodiments, the methods described herein are based solely or primarily on the WiFi diagnostics information that is available at AP 115 (and consequently processing device 110), rather than diagnostic information from clients 160 connected to AP 115. This is advantageous because, in some cases (such as the iPhone iOS) lower level driver data is not exposed to the application.

A variety of parameters are derived from WiFi statistics and are used in connection with the proposed method. It will be appreciated that the exemplary variable and parameter names used below are not intended to be limiting, and instead are used in the interest of brevity.

As used herein, "airtime" refers to a parameter that indicates the length of time that data is actually transmitted on a channel (e.g., a WiFi channel). That is, Airtime=Total data sent in a duration divided by the data rate in that duration. For example, if a client sends data of 100 Mb at a 1000 Mbps data rate, then Airtime=100 Mb/1000 Mbps=0.1 s.

The "Air %" parameter refers to the percentage of airtime occupied to send the data in the specified interval. That is, Air %=Airtime/duration*100. For example, Air %=(0.1 s/1.0 s)*100=10%. If the data is sent, then the Air % is referred to as "Transmit_Air %." If the data is received, then the Air % is referred to as "Receive_Air %."

Figure 2:
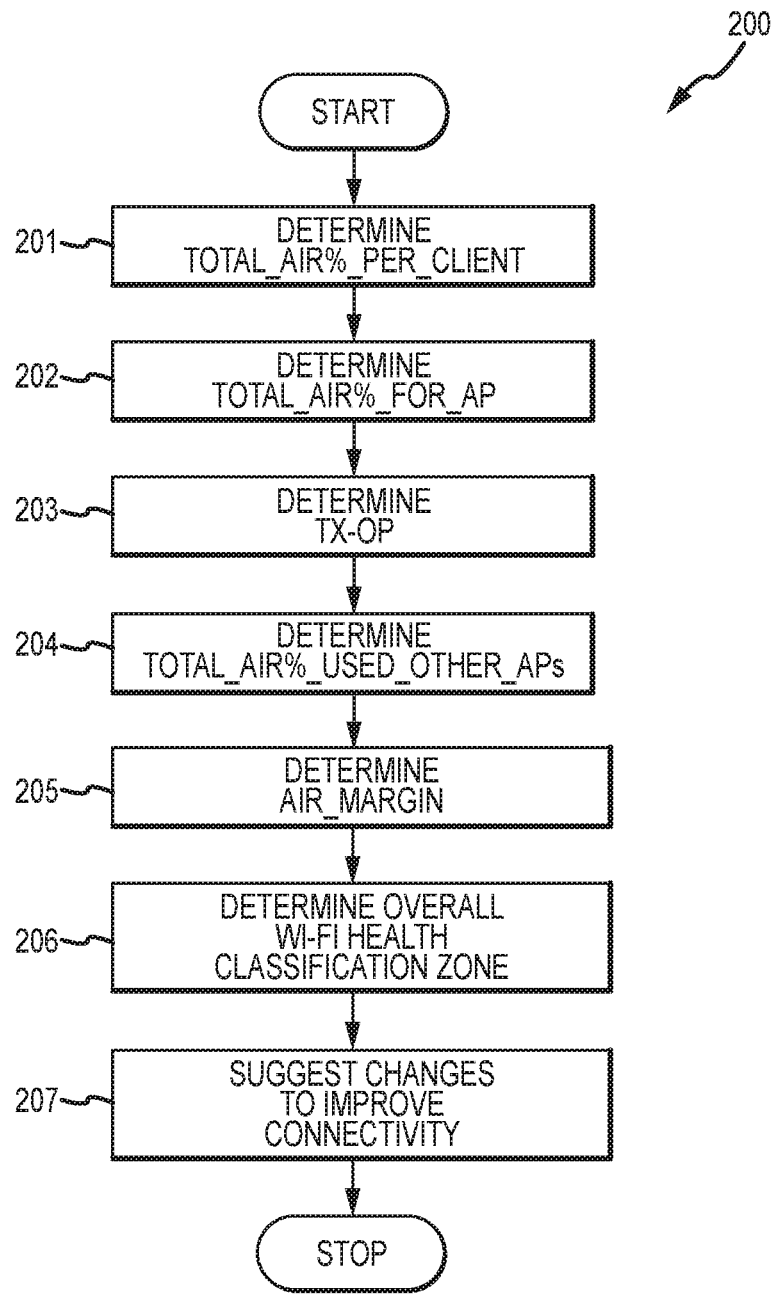
FIG. 2 is a flowchart of an example process executable by the video processing device of FIG. 1.

Step 201 in FIG. 2 includes determining the TOTAL_AIR %_PER_CLIENT. In a specified duration, AP 115 will both transmit and receive; as a result, the total air % occupied by the particular connection between the client and AP is the sum of both Transmit_Air % and Receive_Air %".

Step 202 includes determining TOTAL_AIR %_FOR_AP. That is, if there are n clients connected to AP 115, and all the n clients may either transmit/receive the data, the total air % in the AP is the sum of the total air % occupied by the individual clients. Total_Air %_AP=Total_Air %_Client_1+Total_Air %_Client_2+ . . . +Total_Air %_Client_n.

For example, if three clients are connected and their individual air % values are 5, 10, and 15 respectively, then Total_Air %_AP=5+10+15=30%. This indicates that 30% of the time is utilized by the AP and its clients, and the remaining 70% may be free or it may be used by some other APs.

Next, in step 203, the system determines Transmit Opportunity (TX-OP), which is an indicator of what percentage the WiFi channel medium is free/unused per second. For example, a Tx-Op of 70% indicates that the WiFi channel is used for 30% of 1 second (i.e., for 300 ms some clients/AP is sending or receiving data in that channel)). In other words, the Wi-Fi channel is free for 70% of 1 second.

At step 204, the system determines Total_Air %_Used_Other_APs. This parameter is the relation between Tx_Op and Total_Air %_by_AP, and can be used to find Air % used by other AP's that are available in that location. Total_Air %_used_by_other_APs=100%−Tx_Op−Total_Air %_by_AP. Next, at 205, the system determines the Air_Margin. This parameter indicates how much extra WiFi channel medium is free as compared to the current Air % occupied by the AP. It also indicates the health of the Wi-Fi connection between the AP and client. Further, the streaming (data transfer) nature can be derived using the Air-Margin. A high Air-Margin indicates that streaming would happen smoothly, while a low Air-Margin may result in the under-performance (e.g., buffering) during streaming. Air_Margin=Tx-Op/Total_Air %_by_AP*100%. For example, if a client is connected to an AP and sends 200 Mb data at 1000 Mbps and Tx-Op=60%, then Total_Air %_by_AP=(200 Mb/1000 Mbps)*100=20%. Air_Margin=(60%/20%)*100=300%. In this case, an Air-margin of 300% indicates that bandwidth is available to increase the data threefold. In other words, bandwidth is available to accommodate up to 600 Mb.

Given the Air_Margin, the overall WiFi Health Classification Zone can be determined (step 207) in a variety of ways. In one embodiment, the following zones are used:

| No. | Air-Margin | Observation | Overall Wi-Fi Classification Zone |
|---|---|---|---|
| 1 | Air-Margin >= 100% | Bandwidth is available sufficiently to send the data at the fixed rate and also to receive the data transmitted at the same rate. Streaming is excellent without any issues. | Excellent |
| 2 | Air-Margin < 100% && Air- | Bandwidth is marginally available to send the data at the fixed rate and also to receive the data transmitted at the same rate. | Marginal |

-continued

| No. | Air-Margin | Observation | Overall Wi-Fi Classification Zone |
|---|---|---|---|
| | Margin > 60% | Streaming is fine without any issues, but the Air-Margin remaining is closer to the buffering zone (RED zone). Any further slight reduction in the Air-Margin may result in buffering. | |
| 3 | Air-Margin < 60% | Bandwidth is not sufficient enough to send the data at the required rate and it will result under-performance. Streaming is not fine and it results in more buffering. | Bad |

It will be understood that the above classification is not intended to be limiting, and that any number of classifications based on a variety of factors may be employed.

A variety of commands may be used to extract the parameters required for the Air-Margin calculation as described above. For example, a sta-info command may be run periodically to determine: "Number of Bytes transmitted from AP to the STA", "Number of Bytes received from AP to the STA", "Receive Bytes data rate (RX-MCS)", "RSSI for the connection with STA", "Noise for the connection with STA"

Similarly, the pktq_stats command may be used to extract "Transmit MCS data rate". The chanim_stats command may be used to extract values as follows: Airtime occupied by the inbss traffic is from inbss; Wifi channel idle/free percentage is from txop, Wifi channel occupied by the neighbour networks is from "obss". Finally, the assoclist command may be used to extract the number of clients connected.

It will be appreciated that Air % occupied by individual clients can be used to compare the clients to determine the health of the individual client; it will also give provide regarding how much that client impacts the streaming of others. See, for example, FIG. 3, which illustrates in pie-chart form an example in which two clients are connected and transmitting 8 Mbps data to the AP. The client that is closer to the AP may use less air %, and the client that is far from the AP may use more air %. Thus, the air % ratio between clients can be directly used to compare the health/impact of the individual clients on streaming. Obviously, the farther clients will occupy the WiFi channel for more time, thereby impacting the closer clients. In the illustrated example, CL_1_Air %=5 (i.e., the air % for a first client), CL_2_Air %=7, CL_3_Air %=3, and CL_4_Air %=40%. By inspection of the resulting pie chart, it is clear that CL_4 is occupying a major portion in the total_air %.

FIG. 4 depicts an example in which an individual client air % can impact the "overall-wifi-health". In this example, CL_1_Air %=5%, CL_2_Air %=7%, CL_3_Air %=3%, CL_4_Air %=40%, and TX-OP=45%. Thus, in this case, the Air-Margin=(45/(5+7+3+40))*100=81%.

FIG. 5 depicts an example in which, for a better user experience, the system stops the streaming of client CL_4 because CL_4 is taking a major portion of the air time. In this case, the new TX-OP=45+40=85%. The Air-Margin=(85/(5+7+3))*100=566%. Hence, by stopping CL_4, the overall WiFi will be changed to the Excellent zone (using the table described above). In this example, CL_1_Air %=5, CL_2_Air %=7, CL_3_Air %=3, CL_4_Air %=0, and TX-OP=85.

FIG. 6 depicts an example in which the system informs the user to bring the client CL_4 physically closer to the processing device. In this case, the Air % of CL_4 will decrease by, for example, 40 to 15. Accordingly, the new TX-OP=45+25=70%, and Air-Margin=70/(5+7+3+15) *100=233%. Hence, by moving CL_4, the overall WiFi zone will be changed to the YELLOW zone. In this example, CL_1_Air %=5, CL_2_Air %=7, CL_3_Air %=3, CL_4_Air %=15, and TX-OP=70.

Step 207 in FIG. 2 includes suggesting changes to improve connectivity. This step might include providing a notice to a user and/or automatically making changes to the network. Various troubleshooting messages may be provided (e.g., to a user interface on a respective client 160).

In the event that the RSSI value is very low (e.g., below a predetermined threshold), the user may be presented with the message "You are very far from the processing device and/or or there are obstructions between you and the processing device." In response, the user might move closer to the studio-box and/or avoid any obstructions between the studio-box and the client. In some embodiments, the client is purposely, momentarily disconnected.

In some cases in which the external networks airtime percent is high—there may be other networks actively using the same channel. In this case, the system can provide the message "Your network is congested with nearby WiFi networks." In this case, for example, TOTAL_AIR %_USED_BY_OTHER_APs=approximately>80%. In response, the user may move the setup to a new location where the network is not congested. Alternatively, the available local network may be switched.

In some cases, the "noise" parameter or the AP may be high due to non-802.11 interference or adjacent channel interference. In such a case, the user may be provided with the message "High noise in your network" or the like.

In some embodiments, the "Overall-Wifi-Health-status" and "individual-client-status" is displayed to the client in any suitable fashion. For example, these parameters may be displayed as alphanumeric values (e.g., "81%"). Alternatively, a scale such as that shown above ("excellent", "marginal", "bad") is displayed to the user. In other embodiments, a color scale (e.g., red-to-green) is used to respectively indicate bad-to-good network health.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is initially claimed in this provisional application (without prejudice or disclaimer to any claims that may be subsequently filed) is:

1. A method for determining a health of a plurality of clients in a network, the method comprising:
   connecting a first client of the plurality of clients to an access point wherein the first client is transmitting data to the access point;
   connecting a second client of the plurality of clients to the access point wherein the second client is transmitting data to the access point;
   determining, with a processor, an air percentage used by the first client at the access point within the network;
   determining, with the processor, the air percentage used by the second client at the access point within the network;
   determining, with the processor, a transmit opportunity for the first and second clients based on availability of time free and an air margin associated with a channel medium for both clients to transmit by comparing air percentages occupied in the channel medium to transmit to the access point within the network; and
   determining, with the processor, a health classification of both clients based on air percentage comparisons related to the channel medium for transmitting data within the network for both clients and distances of both clients from the access point.

2. The method of claim 1, further including automatically determining suggested modifications to improve connectivity from at least one of the clients to the access point.

3. The method of claim 1, wherein the network is an IEEE 802.11 wireless network.

4. A media encoder device comprising:
   a processor;
   a memory component configured to store software instructions that, when executed by the processor, perform the steps of:
   determining, with the processor, for a set of clients within a network comprising at least a first and a second client coupled to an access point within the network, an air percentage used to transmit data by each clients;
   comparing, with the processor, an air percentage ratio of air percentage used between the first and second clients which are coupled to the access point to determine a health classification of each client;
   determining, with the processor, a transmit opportunity for the first and second clients which are coupled to the access point that corresponds to a percentage of time a channel medium is free;
   determining, with the processor, an air margin based on the air percentage used by each client when transmitting to the access point; and
   determining, with the processor, the health classification for each client based on comparing of air percentage related to time and amount of air margin for the channel medium of each client.

5. The media device of claim 4, wherein the software instructions further cause the processor to automatically determine suggested modifications to improve connectivity from each client to the access point.

6. The media device of claim 5, wherein the network is an IEEE 802.11 wireless network.

7. A communication system comprising:
   a plurality of clients;
   an access point;
   a media device communicatively coupled to at least one client and another client of the plurality of clients, the access point via a network, and the media device configured to:
   determine, for the at least one client of the plurality of clients, an air percentage to transmit;
   determine, for the another client of the plurality of clients, an air percentage to transmit;

determine a ratio to compare the air percentage available for the at least one client to the another client coupled to the access point within the network;

determine a transmit opportunity corresponding to a percentage of time a channel medium is free for the at least one client;

determine a transmit opportunity corresponding to a percentage of time a channel medium is free for the another client;

determine, an air margin based on the air percentage that is used to transmit by the at least one client to the access point determine, an air margin based on the air percentage that is used to transmit by the another client to the access point; and determine a health classification for the network based on comparisons of ratio of air percentage, time, and air margin of the at least one client and the another client.

8. The communication system of claim 7, wherein the media device is configured to automatically determine suggested modifications to improve connectivity from the at least one client and the another client to the access point.

9. The communication system of claim 7, wherein the network is an IEEE 802.11 wireless network.

10. The communication system of claim 7, wherein the health classification includes at least three zones based on ranges of the determined air margin.

11. The communication system of claim 10, further comprising:

a first zone for a range of the determined air margin greater than or equal to one hundred percent wherein a bandwidth is sufficient to send data at a fixed rate and to receive data at a same rate.

12. The communication system of claim 11, further comprising:

a second zone for the range of the determined air margin less than one hundred percent and greater than sixty percent wherein a bandwidth is marginally available to send the data at the fixed rate and to receive the data at the same rate.

13. The communication system of claim 12, further comprising:

a third zone for the range of the determined air margin less than sixty percent wherein the bandwidth is not sufficient to send the data at the fixed rate and to receive the data at the same rate.

14. The method of claim 1 wherein the air margin is the transmit operation divided by a total air percentage sent by the access point by one hundred percent.

15. The method of claim 1, further comprising:

determining the health classification of both clients by at least three zones based on ranges of the air margin.

16. The method of claim 15, further comprising:

determining a first zone for a range of the air margin greater than or equal to one hundred percent wherein a bandwidth is sufficient to send data at a fixed rate and to receive data at a same rate;

determining a second zone for the range of the air margin less than one hundred percent and greater than sixty percent wherein a bandwidth is marginally available to send the data at the fixed rate and to receive the data at the same rate; and determining a third zone for the range of the air margin less than sixty percent wherein the bandwidth is not sufficient to send the data at the fixed rate and to receive the data at the same rate.

17. The media device of claim 4, wherein the health classification includes at least three zones based on ranges of the determined air margin.

18. The media device of claim 17, further comprising:

a first zone for a range of the determined air margin greater than or equal to one hundred percent wherein a bandwidth is sufficient to send data at a fixed rate and to receive data at a same rate.

19. The media device of claim 18, further comprising:

a second zone for the range of the determined air margin less than one hundred percent and greater than sixty percent wherein a bandwidth is marginally available to send the data at the fixed rate and to receive the data at the same rate.

20. The media device of claim 19, further comprising:

a third zone for the range of the determined air margin less than sixty percent wherein the bandwidth is not sufficient to send the data at the fixed rate and to receive the data at the same rate.

* * * * *